US008646824B2

(12) United States Patent  
Da Costa Pito et al.

(10) Patent No.: US 8,646,824 B2  
(45) Date of Patent: Feb. 11, 2014

(54) AUTOMOBILE TRIM ELEMENT INCLUDING A HOLDER FOR A PORTABLE ELECTRONIC DEVICE

(75) Inventors: Sergio Da Costa Pito, Cergy (FR); Christian Brancheriau, Herblay (FR); Christophe Brunard, Bois Colombes (FR); Didier Ponthieu, La Neuville Saint Pierre (FR); Clement Pinson, Beaumont sur Oise (FR)

(73) Assignee: Faurecia Interieur Industrie, Nanterre (FR)

( * ) Notice: Subject to any disclaimer, the term of this patent is extended or adjusted under 35 U.S.C. 154(b) by 314 days.

(21) Appl. No.: 13/156,697

(22) Filed: Jun. 9, 2011

(65) Prior Publication Data

US 2012/0018473 A1 Jan. 26, 2012

(30) Foreign Application Priority Data

Jun. 9, 2010 (FR) ...................................... 10 54548

(51) Int. Cl.  
*B60R 7/06* (2006.01)

(52) U.S. Cl.  
USPC ...................................... 296/37.12; 296/37.8

(58) Field of Classification Search  
USPC .................. 296/24.34, 37.8, 37.12, 1.07, 1.08  
See application file for complete search history.

(56) References Cited

U.S. PATENT DOCUMENTS

| | | | |
|---|---|---|---|
| 6,012,785 A | | 1/2000 | Kawasaki |
| 6,295,883 B1* | | 10/2001 | Tsukada et al. ............. 74/89.18 |
| 7,201,420 B2* | | 4/2007 | Vican .......................... 296/37.12 |
| 7,413,229 B2* | | 8/2008 | Kukucka et al. ............ 296/24.34 |
| 7,469,951 B2* | | 12/2008 | Welschholz et al. ......... 296/37.8 |
| 7,708,328 B2* | | 5/2010 | Doom et al. ................ 296/37.12 |
| 7,900,988 B2* | | 3/2011 | Ryu ............................ 296/37.12 |
| 8,002,179 B2* | | 8/2011 | Feit et al. ....................... 235/382 |
| 8,104,816 B2* | | 1/2012 | Lupton et al. ................ 296/37.1 |
| 8,172,293 B2* | | 5/2012 | Lota et al. .................. 296/24.34 |
| 8,303,016 B2* | | 11/2012 | Pauken et al. ................ 296/37.8 |
| 2007/0176449 A1* | | 8/2007 | Kukucka et al. ............ 296/24.34 |
| 2008/0174136 A1* | | 7/2008 | Welschholz et al. ....... 296/37.12 |
| 2009/0152418 A1* | | 6/2009 | Bury .......................... 248/205.3 |
| 2009/0174209 A1* | | 7/2009 | Lota et al. .................. 296/24.34 |
| 2013/0093205 A1* | | 4/2013 | Stephan ..................... 296/37.12 |

FOREIGN PATENT DOCUMENTS

| | | |
|---|---|---|
| DE | 198 04 743 B4 | 8/1998 |
| DE | 100 32 657 A1 | 1/2002 |
| EP | 0 890 472 A1 | 1/1999 |
| EP | 1 295 756 A1 | 3/2003 |
| FR | 2 921 315 | 3/2009 |
| JP | 2-158437 | 6/1990 |

* cited by examiner

*Primary Examiner* — Glenn Dayoan  
*Assistant Examiner* — Gregory Blankenship  
(74) *Attorney, Agent, or Firm* — Davidson, Davidson & Kappel, LLC

(57) ABSTRACT

A trim element is provided. The trim element includes an upper surface extending between a front edge and a rear edge, a holder is arranged on the upper surface and a flap. The flap is rotatably movable around an axis (A) of rotation between a retracted position, in which the flap extends substantially parallel to the upper surface, and an upright position, in which the flap forms a non-zero angle with the upper surface. The flap includes a front edge and a rear edge. The axis of rotation (A) of the flap extends near the rear edge of the flap. The flap pivots towards the rear edge of the upper surface between its retracted position and its upright position. A motor vehicle dashboard is also provided.

10 Claims, 3 Drawing Sheets

AUTOMOBILE TRIM ELEMENT INCLUDING A HOLDER FOR A PORTABLE ELECTRONIC DEVICE

This claims the benefit of FR Patent Application No. 10 54548, filed on Jun. 9, 2010 and hereby incorporated by reference herein.

The present invention relates to an automobile trim element including a holder for a portable electronic device and a dashboard comprising such a trim element.

BACKGROUND

An increasing number of portable electronic devices having a growing number of functionalities are available to users, and in particular vehicle drivers. In particular, devices of the mobile telephone or "smartphone" type, PDAs ("personal digital assistant"), navigational systems, or other devices for example make it possible to assist a vehicle's driver to determine a route, obtain traffic information, or help the driver in driving the vehicle. Such devices are for example controlled by a touchscreen that must therefore be accessible to the driver without, however, requiring him to hold the device in his hand, which would constitute a hazard in driving the vehicle.

It is thus known to provide a holder for holding the electronic device near the driver, for example on the dashboard of the motor vehicle, in order to keep the device there while leaving the screen free to make it possible to control it without holding it in one's hand.

It is known to position the holder on the vertical façade of the dashboard, for example near the car radio. However, reading the screen is then complicated because the driver must lower his eyes to see the information displayed on the electronic device.

SUMMARY OF THE INVENTION

To offset this drawback, the holder can be provided on the upper surface of the dashboard. As this surface extends substantially horizontally and the device must be held substantially vertically to allow reading of the screen, the holder then comprises a flap mounted to rotate between an upright position, allowing vertical holding of the electronic device when the latter is fastened on the holder, and a retracted position making it possible to fold the flap down on the upper surface of the dashboard when the device is removed in order to improve the esthetics of the dashboard when the holder is not in use.

The flap goes from the retracted position to the upright position by pivoting from back to front, i.e. by pushing the flap towards the front of the motor vehicle. The electronic device is then fastened to the flap in the upright position so that its screen is visible for the vehicle's driver.

However, such a flap is not satisfactory. Indeed, in the event of an impact against the motor vehicle, the flap in the upright position forms an obstacle protruding from the upper surface of the dashboard. This obstacle can be hazardous for the vehicle's occupants if they are projected forward and collide with the flap or the electronic device, for example.

An object of the present invention may provide a motor vehicle trim element making it possible to easily fasten an electronic device visibly while being safe from the perspective of the safety of the vehicle's occupants in case of collision.

The present invention provides a trim element having an upper surface extending between a front edge, intended to extend on the front side of the vehicle, and a rear edge, intended to extend on the passenger cab side of the vehicle, and a holder for a portable electronic device being arranged on the upper surface. The holder including a flap movable in rotation around an axis (A) of rotation between a retracted position, in which the flap extends substantially parallel to the upper surface, and at least one upright position, in which the flap forms a non-zero angle with the upper surface. The flap includes a fastening means of the electronic device for fastening the electronic device so that the device faces the passenger cab of the vehicle when the flap is in the upright position. The flap also includes a front edge extending opposite the front edge of the upper surface and a rear edge extending opposite the rear edge of the upper surface. The axis of rotation of the flap extends near the rear edge of the flap, and the flap pivots towards the rear edge of the upper surface between its retracted position and its upright position.

The flap is able to move from back to front if an impact is applied against it, for example if an occupant of the vehicle collides with it, the flap can fold down towards its retracted position without opposing any resistance. In this way, the flap no longer forms an obstacle protruding from the upper surface, which makes it safe from the perspective of the safety of the vehicle's occupants.

The trim element may include one or more of the following features:

the flap comprises a maintenance means for keeping the flap in the retracted position and in at least one predefined upright position;

the maintenance means comprises a locking part, integral in rotation with the flap and comprising a notching element, and a maintenance part secured to the upper surface and movable in translation on the axis of rotation of the flap, the maintenance part comprising at least two locking elements having a shape complementary to the notching element, the maintenance part being pushed against the locking part by the return means, the flap being kept in its retracted position or an upright position when the notching element of the locking part cooperates with one of the locking elements of the movable maintenance part;

the notching element is formed by an indexing finger protruding from the locking part, the indexing finger being arranged to move the maintenance part against the return means when the flap rotates between its different positions;

the holder comprises a shaft, secured to the upper surface, the flap being rotatably mounted in the shaft;

the shaft forms a hollow in the upper surface, so that the flap extends substantially in the continuity of the upper surface when it is in its retracted position;

the shaft comprises a passage means for a means for connecting the portable electronic device to an electronic system of the motor vehicle, said connection means being concealed by the flap when it is in its retracted position;

the fastening means of the portable electronic device is arranged to allow the portable electronic device to rotate around an axis of rotation substantially perpendicular to the flap between a vertical display position, in which the electronic device extends substantially vertically when it is fastened on the flap, and a horizontal display position, in which the electronic device extends substantially horizontally when it is fastened to the flap;

the flap is rotationally movable around an axis of rotation extending along the axis of the flap so as to make it possible to adjust the orientation of the portable electronic device when it is fastened to the flap in the upright position; and the flap is arranged to go from its upright position to its retracted position in case of impact from back to front against the flap.

The present invention also provides a dashboard comprising a trim element as described above.

BRIEF DESCRIPTION OF THE DRAWINGS

Other aspects and advantages of the present invention will appear upon reading the following description, provided as an example and done in reference to the appended drawings, in which.

DETAILED DESCRIPTION

In the description, the terms "front," "rear," "upper," etc. are defined in the normal direction of an assembled motor vehicle. The term "longitudinal" is defined in the front-to-back direction of the vehicle, and "transversal" is defined in a direction substantially perpendicular to the longitudinal direction and corresponding to the width of the vehicle.

Figure 1:
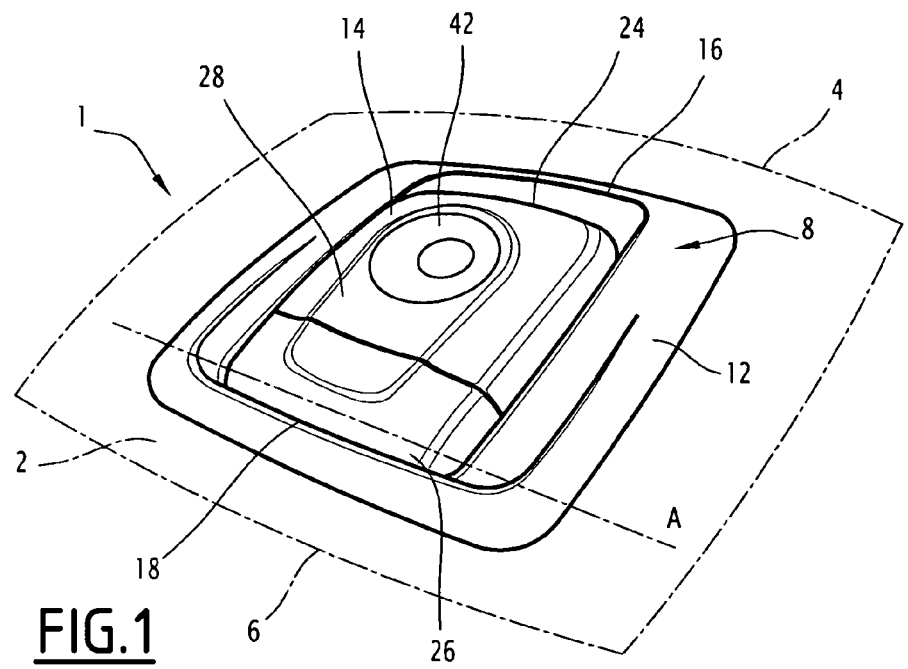
FIG. 1 is a diagrammatic perspective illustration of part of a trim element according to the present invention, the flap of the holder being in the retracted position.

In reference to FIG. 1, a trim element 1 is described, shown partially in the figure. This trim element is for example a vehicle dashboard, or forms part of a dashboard. It is understood that the invention can apply to other vehicle trim elements, such as a center console or other elements.

The trim element 1 comprises an upper surface 2 extending between a front edge 4 and a rear edge 6. The front 4 and rear 6 edges extend in a substantially transversal direction and the upper surface 2 is substantially horizontal when the trim element 1 is mounted in the vehicle. In the case of a dashboard, the front edge 4 is intended to extend on the front side of the vehicle under the windshield thereof and the rear edge 6 is intended to extend on the vehicle passenger cab side at the vertical façade of the dashboard.

A holder 8 for a portable electronic device 10 is arranged on the upper surface 2 and incorporated into the trim element 1. This electronic device 10 can be of any type, but the holder 8 is more particularly adapted to touchscreen devices 10, of the mobile telephone or "smartphone" type, PDA (digital personal assistant), navigational system, or other type. This list of devices is provided as a non-limiting example.

Figure 2:
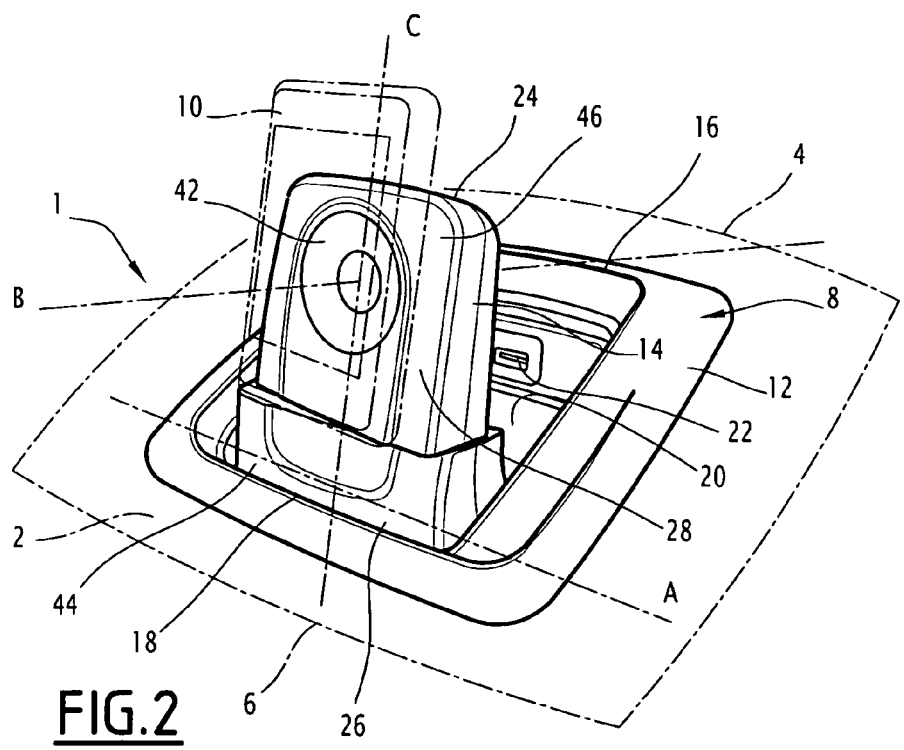
FIG. 2 is a diagrammatic perspective illustration of the holder of FIG. 1, illustrating one possibility for movement of the flap in the upright position.
Figure 3:
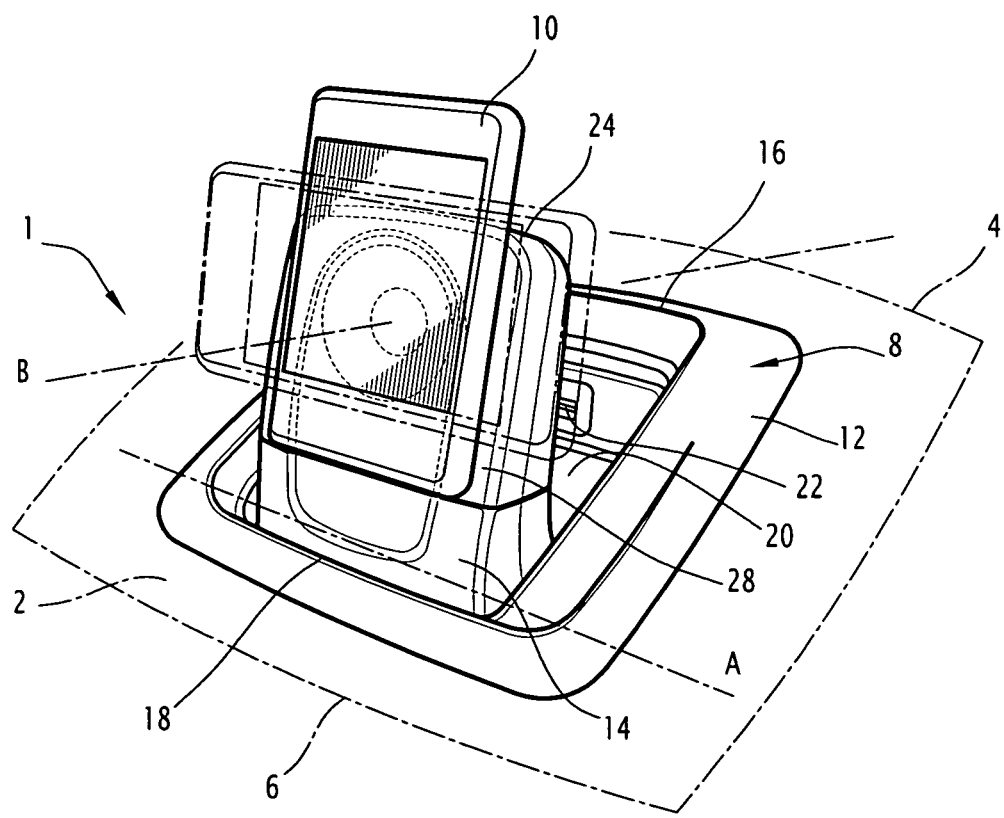
FIG. 3 is a diagrammatic perspective illustration of the holder of FIG. 1 illustrating another movement possibility of the flap in the upright position.

The holder 8 comprises a base or shaft 12 secured to the upper surface 2 and a flap 14 rotationally mounted in the shaft 12. The shaft 12 is arranged substantially at the center of the upper surface and extends substantially longitudinally between a front edge 16, substantially parallel to the front edge 4 of the trim element 1, and a rear edge 18, substantially parallel to the rear edge 6 of the trim element. The shaft 12 for example extends in a depression relative to the holder surface in order to form a cavity 20 therein, as shown in FIGS. 2 and 3, so that the holder 8 is integrated into the trim element 1 without forming a protrusion relative to the upper surface 2 when the device is not in use, as will be described later. The shaft 12 comprises a passage 22, for example, an outlet or opening for a connection from electronic device 10 to an electronic system of the motor vehicle. This passage 22 is for example formed by an orifice or indentation made in a wall of the shaft, as shown in FIGS. 2 and 3.

The flap 14 is rotatably mounted in the shaft 12 between a retracted position (FIG. 1), in which the flap 14 extends substantially parallel to the upper surface 2 inside the shaft 12, and at least one predefined upright position (FIGS. 2 and 3), in which the flap 14 protrudes relative to the shaft 12 and forms a non-zero angle with the upper surface 2.

The flap 14 has a shape substantially complementary to that of the shaft 12, so that in the retracted position, the flap 14 closes the shaft 12 and extends in the extension of the upper surface 2, as shown in FIG. 1. Thus, in the retracted position, the flap 14 does not form a protuberance or protrusion relative to the upper surface 2, which imparts satisfactory esthetics to the trim element 1. Furthermore, in this position, the flap 14 does not form a hard obstacle protruding from the upper surface 2 in the passenger cab, which limits the risk of injury for the vehicle's passengers in case of an impact against the vehicle. In the retracted position, the flap 14 also conceals the connection or means for connecting the electronic device 10 to an electronic system of the motor vehicle, the connection extending to the bottom of the shaft 12 under the flap 14.

The flap 14 also has a front edge 24, extending opposite the front edge 16 of the shaft 12 in the retracted position, and a rear edge 26, extending opposite the rear edge 18 of the shaft 12 in the retracted position.

The flap 14 can for example be positioned in several upright positions, in each of which the flap 14 forms an angle for example between 30° and 90° with the upper surface 2. The movement from the retracted position to an upright position is done by rotating the flap 14 around a substantially transversal axis A extending near the rear edge 26 of the flap 14 and the rear edge 18 of the shaft 12. Since this axis extends near the rear edges 26 and 18, it is understood that the rotation between the retracted position and one of the upright positions is done from front to back. Thus, the upper face 28 of the flap 14, which is in the continuity of the upper surface 2 in the retracted position, faces the rear of the vehicle in the upright position, as shown in FIGS. 2 and 3. Having to rotate the flap from front to back to put it in the upright position makes it possible to offer greater safety to the vehicle's passenger in case of impact. Indeed, if a passenger collides with the flap 14 in the upright position, flap 14 can be folded down into the retracted position by tilting forward. In this way, the flap 14 does not form a hard and resistant obstacle in case of back-to-front shock, which makes it possible to protect the vehicle's passengers.

Figure 4:
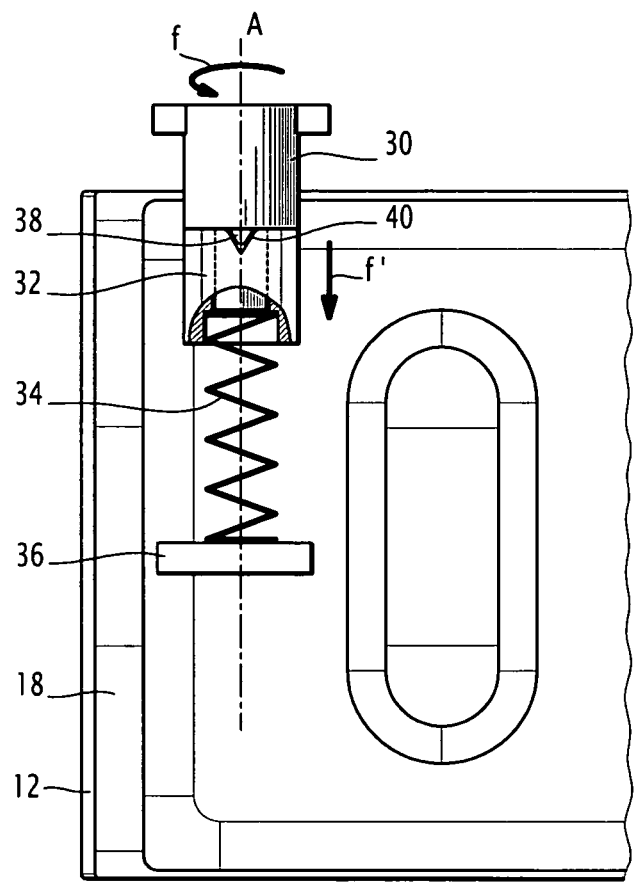
FIG. 4 is a diagrammatic cross-sectional illustration of part of the holder, showing the means for maintaining the flap.

The holder 8 comprises a maintenance means, for example, a locking device or maintenance device, for maintaining the flap in the retracted position and in the upright positions. This means is shown diagrammatically in FIGS. 4 and 5. The maintenance means comprises a locking part 30 integral in rotation with the flap 14 (only locking part 30 being shown in FIG. 4, the flap not being shown for simplification reasons) and a maintenance part 32 integral with the shaft 12 and arranged opposite the locking part 30. The maintenance part 32 is mounted movable in translation relative to the shaft 12 along the axis of rotation A of the flap 14 and is pushed against the locking part 30 by a return means or return device 34, which may be, for example, formed by a spring. To that end, the maintenance part 32 and the return device 34 for example move in a channel formed in the lower face of the flap 14, the channel being closed, on the one hand, by the locking part 30 and, on the other hand, by a stop 36 integral with the bottom of the shaft 12. The return device 34 is mounted between the stop 36 and the maintenance part 32, as shown in FIG. 4.

Figure 5:
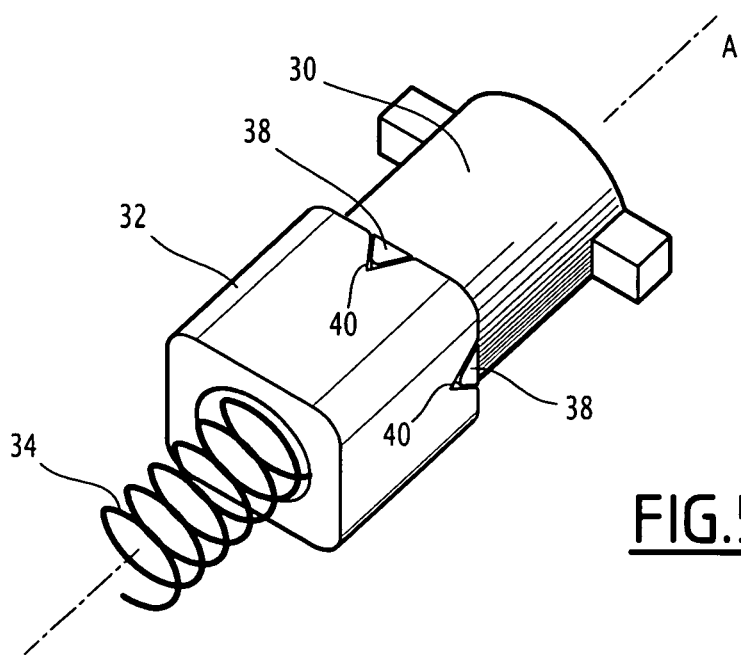
FIG. 5 is a diagrammatic perspective illustration of the maintenance means of FIG. 4.

The locking part 30 comprises at least one notching element 38, for example formed by an indexing finger, protruding transversely from the locking part 30 towards the maintenance part 32. The maintenance part 32 comprises at least two locking elements 40 angularly offset around the axis of rotation A and with a shape complementary to the notching element 38. Thus, as shown in FIGS. 4 and 5, the locking elements 40 are for example each formed by a notch complementary to the indexing finger.

In the retracted position or in one of the upright positions, the notching element 38 cooperates with one of the locking elements 40, i.e. the indexing finger is introduced into a corresponding notch so as to keep the flap 14 in its position owing to the return device 34, which pushes the maintenance part 32 against the locking part 30. During the transition from one position to another, the locking part 30 turns with the flap 14 (arrow f of FIG. 4), which makes the indexing finger leave the notch by pushing the maintenance part 32 against the return device 34 (arrow f' of FIG. 4). The indexing finger slides on the maintenance part 32 until it is located opposite a notch corresponding to another position of the flap 14, the return device 34 then pushes the maintenance part 32 against the locking part 30, the indexing finger entering the notch, which makes it possible to keep the flap 14 in its new position. The maintenance part 30 comprises as many locking elements 40 as there are positions provided for the flap 14. Alternatively, the indexing finger can be provided on the maintenance part 32 and the notches provided in the locking part.

Such a maintenance device makes it possible to keep the flap 14 in the chosen position simply, without requiring a particular locking or unlocking by the user outside the rotation of the flap 14. The maintenance device is arranged to keep the flap 14 in position when it holds a portable electronic device 10. Beyond a certain force, the maintenance device is arranged to allow the flap 14 to rotate, in particular when a user wishes to make the flap 14 go from one position to another or when there is an impact from back to front, so as to allow the flap 14 to fold down into its retracted position.

In the upright position, the flap 14 makes it possible to hold a portable electronic device 10 so that its screen is opposite the occupants of the motor vehicle according to certain orientations as a function of the angle formed between the flap 14 and the upper surface 2. In this position, the screen is accessible to view its display and use it, in the event of a touchscreen.

The fastening of the electronic device 10 on the flap 14 is done by a fastening element 42, for example, a fastener, arranged on the upper surface 28 of the flap 14. In the figures, this fastening element 42 has been shown diagrammatically. It can be of any suitable type. According to one embodiment, the fastening element 42 is adapted to allow rotation around an axis of rotation B substantially perpendicular to the flap of the portable electronic device 10 between a vertical display position in "portrait" mode, shown in solid lines in FIG. 3, and a horizontal display position in "landscape" mode, shown in broken lines in FIG. 3. In portrait mode, the screen of the device 10 extends substantially vertically and in landscape mode, the screen extends substantially horizontally. Rotating the device 10 around the axis B using the fastening element 42 makes it possible to adapt the position of the screen to better read its display.

According to one preferred embodiment, the flap 14 is made in two parts 44 and 46, one of which, supporting the fastening element 42 of the device 10, is able to rotate relative to the other around the axis of rotation C extending along the axis of the flap 14 so as to make it possible to adjust the orientation of the portable electronic device 10, when it is fastened to the flap 14 in the upright position. Thus, by rotating around the C axis, the screen of the device 10 can be turned towards the driver or the passenger in the front seat of the vehicle, for example, as shown in FIG. 2.

The trim element 1 has been described according to one particular embodiment. Alternatives can be made to the invention without going beyond the scope thereof. For example, the flap 14 can be fastened directly on the upper surface 2 without being arranged in a shaft 12.

The trim element 1 described above makes it possible to hold a portable electronic device on a substantially horizontal surface, for example the upper surface of the vehicle's dashboard, which makes it possible to position this device in a location where the reading or handling thereof is particularly easy. Moreover, the holder is particularly easy to use and offers a wide variety of choices in positioning the device relative to the user. Lastly, this holder may provide better safety, the flap being able to fold down into its retracted position in case of impact against it.

What is claimed is:

1. An automobile trim element comprising:
   an upper surface extending between a front edge on a front side of a vehicle and a rear edge on a passenger cab side of the vehicle; and
   a holder for a portable electronic device arranged on the upper surface, the holder including a flap;
   the flap rotatable around an axis of rotation (A) between a retracted position, in which the flap extends substantially parallel to the upper surface, and at least one upright position, in which the flap forms a non-zero angle with the upper surface,
   the flap including:
   a fastener for fastening the electronic device so the electronic device faces the passenger cab side when the flap is in the at least one upright position;
   a front flap edge extending opposite the front edge of the upper surface; and
   a rear flap edge extending opposite the rear edge of the upper surface, the axis of rotation (A) of the flap extending near the rear edge of the flap, the flap pivoting towards the rear edge of the upper surface between the retracted position and the at least one upright position, wherein the flap goes from the at least one upright position to the retracted position during an impact from back to front against the flap.

2. The trim element according to claim 1, further comprising a maintenance device for keeping the flap in the retracted position and in the at least one upright position.

3. The trim element according to claim 1, wherein the maintenance device includes a locking part integral in rotation with the flap, a notching element, and a maintenance part secured to the upper surface and movable in translation on the axis of rotation (A) of the flap, the maintenance part including at least two locking elements having a shape complementary to the notching element, the maintenance part being pushed against the locking part by a return device, the flap being kept in the retracted position or the at least one upright position when the notching element of the locking part cooperates with one of the at least two locking elements of the maintenance part.

4. The trim element according to claim 3, wherein the notching element is formed by an indexing finger protruding from the locking part, the indexing finger being arranged to move the maintenance part against the return device when the flap rotates between the retracted position an at least one upright position.

5. The trim element according to claim 1, wherein the holder includes a shaft secured to the upper surface, the flap being rotatably mounted in the shaft.

6. The trim element according to claim 5, wherein the shaft forms a depression in the upper surface, so that the flap extends substantially in the continuity of the upper surface when the flap is in the retracted position.

7. The trim element according to claim 5, wherein the shaft includes a passage for a connection from the portable electronic device to an electronic system of the vehicle, the connection being concealed by the flap when the flap is in the retracted position.

8. The trim element according to claim 1, wherein the portable electronic device, when fastened to the fastener, is rotatable around an axis of rotation (B) substantially perpendicular to the flap between a vertical display position, in which the electronic device extends substantially vertically when fastened to the flap, and a horizontal display position, in which the electronic device extends substantially horizontally when fastened to the flap.

9. The trim element according to claim 1, wherein the flap is rotationally movable around an axis of rotation (C) to adjust an orientation of the portable electronic device fastened to the flap in the at least one upright position.

10. A motor vehicle dashboard comprising:
a trim element as recited in claim 1.

* * * * *